(12) United States Patent
Picoult et al.

(10) Patent No.: US 6,654,601 B2
(45) Date of Patent: Nov. 25, 2003

(54) METHOD AND SYSTEM FOR REMOTE RETRIEVAL OF MESSAGES USING SPONTANEOUS NETWORKING TECHNOLOGY

(75) Inventors: Cheryl L. Picoult, Monroe, CT (US); John H. Winkelman, Southbury, CT (US); Kevin L. Strobel, Fairfield, CT (US); James R. Norris, Jr., Danbury, CT (US); John W. Rojas, Norwalk, CT (US)

(73) Assignee: Pitney Bowes Inc., Stamford, CT (US)

(*) Notice: Subject to any disclaimer, the term of this patent is extended or adjusted under 35 U.S.C. 154(b) by 98 days.

(21) Appl. No.: 09/727,893

(22) Filed: Nov. 30, 2000

(65) Prior Publication Data

US 2002/0065042 A1 May 30, 2002

(51) Int. Cl.[7] .............................................. H04M 11/10
(52) U.S. Cl. ................................ 455/412.1; 455/414.1; 379/100.13
(58) Field of Search ................................. 455/412, 413, 455/414, 415, 418, 419, 420, 550, 445, 575, 461, 41.2; 709/200, 217, 228, 223, 206, 207; 379/88.22, 100.08, 93.07, 93.08, 100.13

(56) References Cited

U.S. PATENT DOCUMENTS

| | | | |
|---|---|---|---|
| 5,068,888 A | 11/1991 | Scherk et al. | |
| 5,168,444 A | 12/1992 | Cukor et al. | |
| 5,327,486 A | * 7/1994 | Wolff et al. | 455/414 |
| 5,459,458 A | 10/1995 | Richardson et al. | |
| 5,513,126 A | 4/1996 | Harkins et al. | |
| 5,675,507 A | * 10/1997 | Bobo, II | 709/206 |
| 5,692,048 A | 11/1997 | Gormish et al. | |
| 5,742,905 A | * 4/1998 | Pepe et al. | 455/461 |
| 5,787,149 A | 7/1998 | Yousefi et al. | |
| 5,790,790 A | 8/1998 | Smith et al. | |

(List continued on next page.)

FOREIGN PATENT DOCUMENTS

| | | | | |
|---|---|---|---|---|
| EP | 0 821 507 A2 | * 1/1998 | | H04L/12/28 |
| EP | 1045574 A1 | 10/2000 | | |
| EP | 1 091 536 A2 | * 4/2001 | | H04L/29/06 |
| EP | 1146684 A2 | 10/2001 | | |
| WO | WO 00/79732 A1 | 12/2000 | | |

*Primary Examiner*—Charles Appiah
(74) *Attorney, Agent, or Firm*—Ronald Reichman; Kimberly Chotkowski; Angelo N. Chaclas (57) ABSTRACT

The present invention is directed to a method and system for remote receipt of a message, such as a telephone, e-mail, facsimile or paper message. A server or data center is provided for receiving messages from a sender communicating with a recipient mobile device. The data center sends the message to the mobile device. If the recipient desires to receive the message, he/she indicates this on his/her mobile device. The mobile device and the device which will receive the message, i.e., the destination device, are spontaneously networked such that the mobile device communicates the information to the destination device without requirement of ensuring the compatibility of programs or networks. Prior to transmission, the mobile device determines if any translation or transcoding of the original message is required in order for the destination device to receive the message in proper format. Once transcoding or translation is effected, the message is routed to the destination device for output.

12 Claims, 5 Drawing Sheets

U.S. PATENT DOCUMENTS

| | | | |
|---|---|---|---|
| 5,802,460 A | * 9/1998 | Parvulescu et al. | 455/550 |
| 5,832,221 A | * 11/1998 | Jones | 709/206 |
| 5,873,077 A | 2/1999 | Kanoh et al. | |
| 5,966,663 A | 10/1999 | Gleason | 455/466 |
| 5,983,073 A | 11/1999 | Ditzik | |
| 6,002,752 A | 12/1999 | Park | |
| 6,006,087 A | 12/1999 | Amin | 455/413 |
| 6,008,727 A | 12/1999 | Want et al. | 340/572.1 |
| 6,008,921 A | 12/1999 | Brusky et al. | |
| 6,072,862 A | * 6/2000 | Srinivasan | 379/100.08 |
| 6,119,137 A | 9/2000 | Smith et al. | |
| 6,134,433 A | 10/2000 | Joong et al. | 455/417 |
| 6,216,158 B1 | 4/2001 | Luo et al. | |
| 6,240,183 B1 | 5/2001 | Marchant | |
| 6,256,378 B1 | 7/2001 | Iggulden et al. | |
| 6,289,212 B1 | 9/2001 | Stein et al. | |
| 6,297,891 B1 | 10/2001 | Kara | |
| 6,378,070 B1 | 4/2002 | Chan et al. | |
| 6,493,696 B1 | * 12/2002 | Chazin | 706/47 |
| 6,587,871 B1 | * 7/2003 | Schrader | 709/206 |
| 6,594,349 B2 | * 7/2003 | Fortman | 379/88.14 |
| 2001/0037462 A1 | 11/2001 | Bengtson | |

\* cited by examiner

METHOD AND SYSTEM FOR REMOTE RETRIEVAL OF MESSAGES USING SPONTANEOUS NETWORKING TECHNOLOGY

RELATED APPLICATIONS

The present application is related to U.S. application Ser. No. 09/707,561 entitled "Method and System for Remote Retrieval of Documents" filed contemporaneously hereto and assigned to the assignee of the present invention.

The present application is related to U.S. application Ser. No. 09/728,237 entitled "Method and System for Remote Printing of Documents", filed contemporaneously hereto and assigned to the assignee of the present invention.

FIELD OF THE INVENTION

The invention disclosed herein relates generally to the field of messaging. More particularly, the present invention relates to a system and method for sending and retrieving messages remotely. Specifically, this invention implements wireless technology and document transformation to communicate a message to a mobile recipient for remote access.

BACKGROUND OF THE INVENTION

In today's rapidly paced society, professional and personal demands on messaging technologies, such as voice mail, e-mail, facsimile and pagers, have greatly increased. The development of this technology, in turn, has increased demands on mobile people who rely on these messaging devices for a variety of business and social communications. Specifically, these expectations have forced the mobile professional to demand the ability to receive messages regardless of time, location, or availability of messaging devices. According to a recent study by Pitney Bowes Inc. of Stamford, Conn., a typical business professional receives 169 messages a day. Many of these messages are delivered using some form of electronic and mobile communication such as cellular telephones, facsimiles, analog/digital telephone, pagers, e-mail transmission, and personal digital assistants. These messages help determine the mobile professional's daily plans, keep him/her in contact with his/her community and enable him/her to accomplish his/her professional and personal goals.

Users, recognizing the capabilities of these devices, have relied on these devices such that they have become nearly indispensable tools for many businesses and individual consumers. Specifically recognized as invaluable are the inherent capabilities of a facsimile as an effective means of quickly and efficiently transmitting many types of documents from one known and specified location to another known and specified location. Facsimile machines are indispensable global tools, because they are used throughout the world and are accessible by and compatible with any other facsimile in the world. In addition, the use of facsimile machines has significantly improved the speed of transmittal of documents as compared to the sending of such a document through the postal services and/or various other express courier services, which, in general, require overnight delivery. Furthermore, facsimile machines have eased the travel burden on mobile professionals by eliminating the total number of printed documents they must carry to offsite meetings. With the aid of facsimile machines, any forgotten necessary documents may be retrieved by a simple facsimile.

Also in recent years, photocopiers have become more than just a reproduction machine. Photocopiers, which exist in virtually every office environment, have integrated the capabilities of printing and the flexibility of facsimile to become a valuable office tool. These machines have opened a new channel for communication which will enable mobile professionals to operate more efficiently and effectively.

In typical document messaging systems, a person desiring to send a print form of a message, such as a facsimile, must know the physical location of the intended recipient in order to insure that the intended recipient will be the actual recipient of the transmitted message. These systems require the message sender to first contact the intended recipient to determine a location, a time and a facsimile number where a message may be received. If the message is a confidential communication, the sender also must know that the recipient will be present at the precise time the sender transmits the facsimile. If the recipient is not physically present at the facsimile machine, the intended recipient may never receive the message, and/or any confidentiality may be broken.

In another messaging scenario where an individual desires to access and print his/her e-mail messages remotely using his/her laptop computer, the recipient first must locate a telephone line to enable access to the recipient's e-mail. The recipient must then locate and access either a dedicated printer or a networked printer in order to print the e-mail. Often, the access to a company's network is protected, and visitors are not authorized to use the network without a cumbersome approval process. Moreover, if the e-mail has accompanying attachments, the intended recipient must also insure that the attachments are in a software program format which is loaded on the accessed network or that the program is present on the intended recipient's computer. Meeting these requirements is both time consuming and, often, unattainable.

In another messaging scenario, the sender of the message may choose to send the recipient an e-mail message, a voice message, a facsimile or even a paper message, while the recipient prefers to receive the message in a print format. The present systems do not allow the flexibility to easily enable this access to messages and documents. In most systems, the lack of integration between an input device and a destination device means that a message recipient must separately utilize a variety of messaging and delivery systems in order to access the desired information. In a voice messaging scenario, this often means that the recipient must call into a phone system to check whether any voice messages exist, manually set call forwarding to a network for translation into a readable form, and then remotely log onto a network to receive the message.

In another scenario, a message recipient may choose to access his/her messages through his/her personal digital assistant; however, the personal digital assistant may not have enough memory to reproduce the entire e-mail and/or the attachments. This scenario requires the recipient to contact either his/her assistant to arrange a time and location to have the facsimile sent, or it requires the recipient to contact the message originator himself or herself to have the documents directly transferred. If the message is a voice mail sent to a recipient and the recipient desires a print version, the recipient either must have his/her assistant transcribe the voice message, or the recipient must employ voice to text conversion Again, in order for the recipient to actually receive a physical print copy of the voice text, the recipient must arrange for a facsimile transmission. The above example presents some of the problems associated with remote retrieval of document. It is to be appreciated that many such examples exist.

One example of a solution to this problem has been disclosed by EFAX.COM™, a Delaware corporation having headquarters in Menlo Park, Calif. EFAX.COM™ produces a product which enables a mobile professional to receive facsimiles and voice mail messages using a wireless device. However, the EFAX.COM™ product requires that the recipient know the facsimile number of the machine to be used for printing and further requires the sender to manually enter that number into the sender's wireless device. Furthermore, the EFAX.COM™ does not translate voice to facsimile; therefore, voice transmission sent is to an e-mail as an attached audio file using a proprietary format.

Therefore, there now exists a requirement to enable the mobile professional the flexibility and ease of access to his/her messages at any time and location which have originated from any messaging format.

SUMMARY OF THE INVENTION

The present invention is directed to a method and system for remote receipt of a message, such as a telephone, e-mail, facsimile or paper message. This invention allows mobile people such as telecommuters, sales people, professional people having multiple offices; business travelers; professionals who do not have a dedicated assistant; and anyone having a message flow, the ability to receive their messages at a variety of locations in a variety of formats with ease and flexibility. In today's environment, even when professionals strive for a paperless office, there remains a need for paper documents. Paper is a collaborative media and, as such, fosters innovation, design and teamwork. Paper is also a legal media often required when finalizing contracts. Finally, paper is a more permanent media often used for storing knowledge.

Therefore, it is often desirous for mobile professionals to have at their fingertips a plethora of information which may be received in a variety of tangible media without regard to the recipient's location or the format in which the document was created. Paper also finds a significant use as a translation. In other words, a message may be sent by paper yet received in an electronic form, or a message may be communicated in an electronic form and received in a printed form. Furthermore, a message may be sent in a paper form, transmitted to its destination in electronic form, and then printed into a paper format. The present invention provides these mobile professionals the ability to receive their documents and messages, unrestricted and unlimited, by time, location, and document format.

This invention incorporates aspects of "unified mail", "unified messaging", and "universal messaging" to result in a remote messaging solution. "Unified messaging" transmission is the ability to create and respond to the originator of multimedia messages with accuracy from a telephone, a personal computer or other hand-held device. "Unified mail" is the ability to store messages of all media type: voice, facsimile, e-mail, video, paging, in a single mailbox with accessibility by a personal computer, a telephone, or other hand-held device. "Universal messaging" is the ability to create any type of message and to send the message without regard to the recipient's mailbox requirements. This invention also incorporates spontaneous communication technology such as Bluetooth to deliver the documents to a print device.

The present invention provides a server or data center for receiving messages from a sender. The message or messages may be voice, facsimile, e-mail, video messages or other electronic form of data. The data center then sends the message to an intended message recipient's mobile device, such as a personal digital assistant, cellular phone or laptop. The mobile device is then prompted to indicate to the recipient that a message has been sent, and that the message is at the mobile device to be printed. The message recipient determines where, when and if he/she desires to retrieve the message. The recipient may choose to receive one or more messages and selected attachments, regardless of the format, in a single transmission by selecting those messages on his/her mobile device. This requires the system to place only one telephone call to send/receive a myriad of messages. The mobile device includes a wireless communications technology such as Bluetooth which is a universal radio interface in the 2.45 $GH_z$ frequency band that enables ad-hoc, wireless connectivity and allows portable electronic devices to connect and communicate wirelessly via short range. Therefore, the users may "transparently" log in to the system via a hand-held device without specifically typing in a user name and a password. The message recipient merely brings the mobile device within wireless range to a destination device which is also Bluetooth compatible.

If the mobile device does not have enough memory to receive the entire document, the data may be summarized, and the destination device may retrieve sections of the document. The mobile device then determines if any translation or transcoding of the original message is required in order for the destination device to receive the message in a format which is compatible with that of the desired destination device. For example, the message sent may be an e-mail, voice communication or by paper (in facsimile or scanned form), and the desired receipt may also be in any of the same variety of formats. Once transcoding or translation is effected, the message is routed to the identified destination device, which then outputs the message. A confirmation of delivery may be sent to the original sending party either directly or via the data center, in order to provide assurance that certain messages have been received. Once a facsimile has been received by the recipient, the system may send a confirmation of delivery by a variety of devices such as a facsimile. In addition, if the recipient did not receive the facsimile within a designated period of time, then a message may be sent to the original sender indicating non-receipt.

According to another aspect of the present invention, the recipient may be required to reply to a notification of a message or to actual receipt of a message within a specified period of time. If the recipient does not reply to the notification within a specified period of time, then the notification is re-sent. This may be implemented, for example, when important messages are sent and it is necessary for the sender to know if the message was received.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
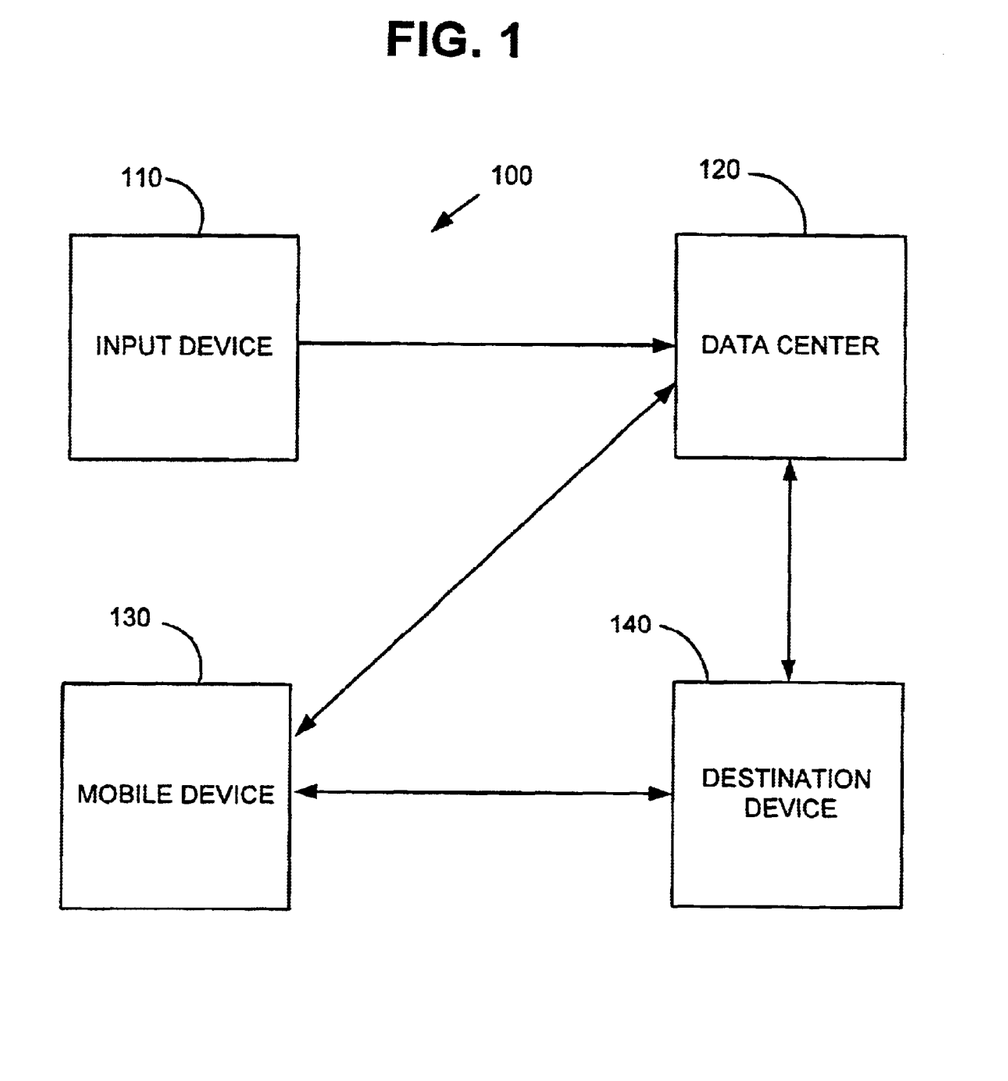
FIG. 1 is a diagram of the overall system of the present invention.

In describing the present invention, reference is made to the drawings, wherein there is seen in FIG. 1 an overall diagram of the remote messaging system of the present invention, designated as reference numeral 100. System 100 includes input device 110 for sending a message to data center 120. Input device 110 may be a scanner, facsimile, a computer based device, a telephone, or photocopier. The preferred embodiment is shown with having a message sent directly to data center 120; however, it is to be understood that the message may first be sent to a recipient's default destination such as e-mail, facsimile or voice, which then routes to data center 120. The messages sent via input device 110 may be voice, e-mail, facsimile, or any other message format, which is already in or may be converted to electronic form. Data center 120 stores the message, identifies the intended recipient, and sends the message to a recipient via mobile device 130. Data center 120 may also determine the recipient's preferences for receiving notice that a message has been sent. Mobile device 130 may be a Bluetooth-enabled, laptop computer, personal digital assistant, pager, and/or cell phone. Mobile device 130 performs any translation or transcoding that may be required for the document to be received at the destination device.

Transcoding refers to changing the presentation to fit the capabilities of a display on a device with limited features. For example, International Business Machines (IBM) has a transcoding proxy that takes HTML from a normal web page and pares it down to meet device constraints. In order to accomplish this task, commonly all graphics are stripped out since many mobile devices do not handle graphics well, and graphics also tend to be too large in size and would take long to send over a low band with connection.

"Transcoding" reduces the size of the file for ease of transfer. "Translation", on the other hand, refers more to document format versus application. For example, in order to send WORD™ or EXCEL™ documents to a facsimile machine, the document needs to be "translated" into a format that the facsimile machine understands, which is a bitmapped image file (e.g., a TIFF format).

A mobile device receives the message and attachments and sends the selected messages and/or attachments to destination device 140. The mobile device may first receive a notification that a message exists, and then the user may select the desired message which is then sent from the data center to the mobile device. Furthermore, in the event that memory of the mobile device is not capable of handling the entire document, the mobile device may be programmed only to receive part of the document. Thereafter, once the destination device receives the first sent portion of the document, the mobile device then receives subsequent portions of the document until the entire document is sent. Destination device 140 may be any means of receiving a printed message, such as a facsimile, photocopier and a printer, which is wireless capable, such as Bluetooth. In order for destination device 140 to receive a Bluetooth-enabled communication, the destination device must also have some additional software that will allow the mobile device to simply send the document to the destination device.

Figure 2:
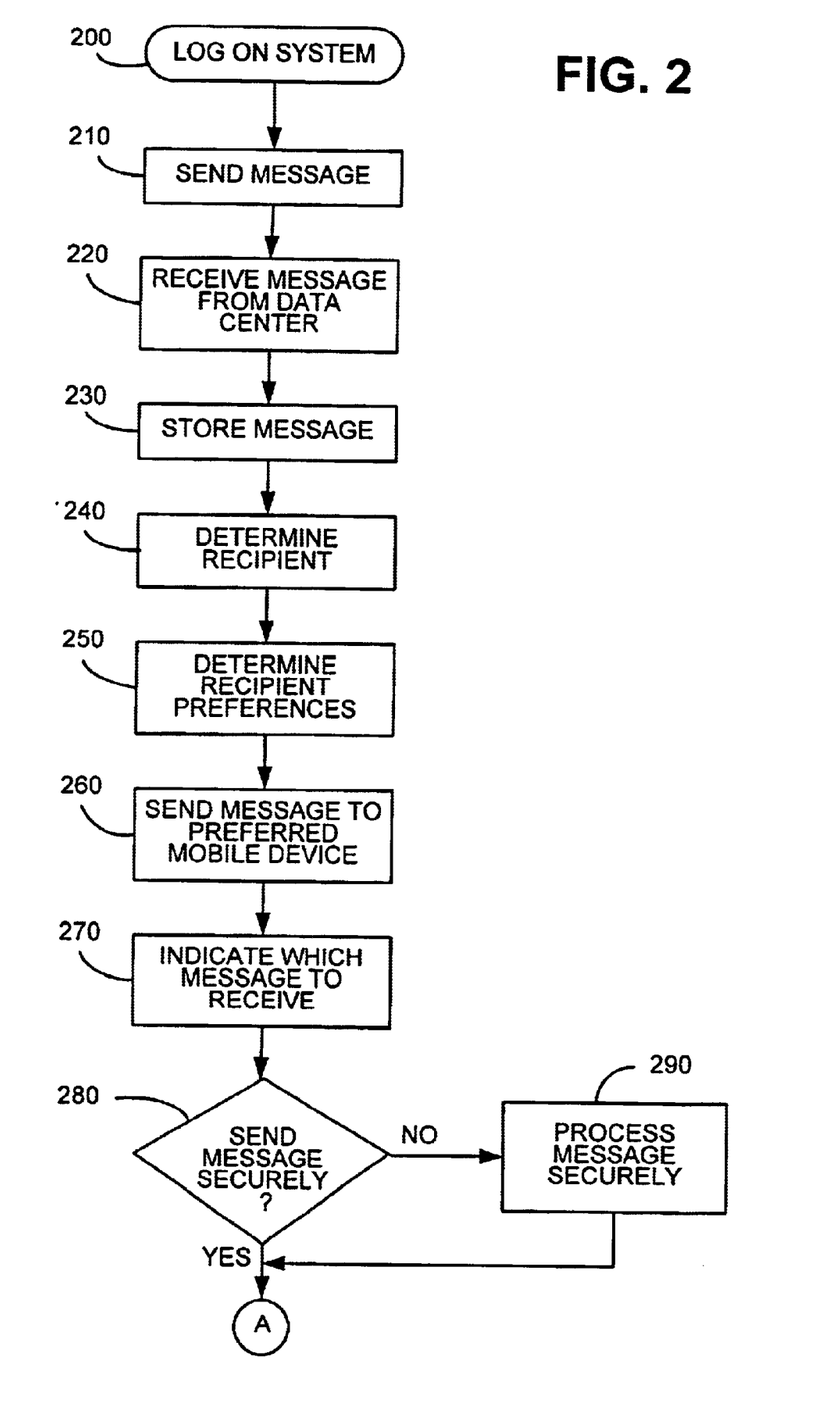
FIG. 2 is a flow chart depicting the method of the present invention.

Now turning to FIG. 2, there is shown one embodiment of the method flow of the present invention. Beginning at step 200, the message sender logs onto the system. At step 210, a message is sent. The system may be designed such that the message is sent directly to a recipient's root address (i.e., the recipient's home facsimile number, e-mail, or voice mail system). In turn, the home machine routes the message to data center 120. The sender also may connect directly with a website or data center to send the message directly to data center 120. At step 220, a message is received at data center 120. At step 230, data center 120 stores the message, and at step 240 reads the message and determines the intended recipient.

Continuing at step 250, data center 120 determines whether any individual user preferences have been stored in the data center 120. The user preferences guide the data center 120 as to how the recipient receives the messages, whether automatic delivery for certain documents or destinations is requested, and perhaps even screens the messages based on sender ID, message content or other filter settings. The specific destination address may be based upon an itinerary communicated to data center 120, or it may be a default device. It is to be appreciated that if delivery is made based upon an itinerary, the recipient, at any time, may override the database itinerary parameters.

The method flow chart continues at step 260 where data center 120 sends to recipient's determined preferred mobile device 130 a message and any attachments. The message may be sent directly, automatically, and in accordance with a predetermined sent of criteria or upon the user prompting the request. At step 270, recipient selects on mobile device 130 which message recipient desires to receive. At step 280, the recipient may be queried as to whether or not the recipient would like the message to be sent securely. If the answer to the query at step 280 is "no", then the method progresses directly along path A. If, however, the answer to the query at step 280 is "yes," then the method proceeds to step 290 where the message is processed for secure transmission. Secure transmission may be effected in a variety of methods such as by public key, private key encryption, or the like. Such security techniques are well-known in the art of secure messaging; therefore, a detailed description of these secure transfer technologies is not required for an understanding of this invention. The method then progresses from step 290 to continue along path A.

Figure 3:
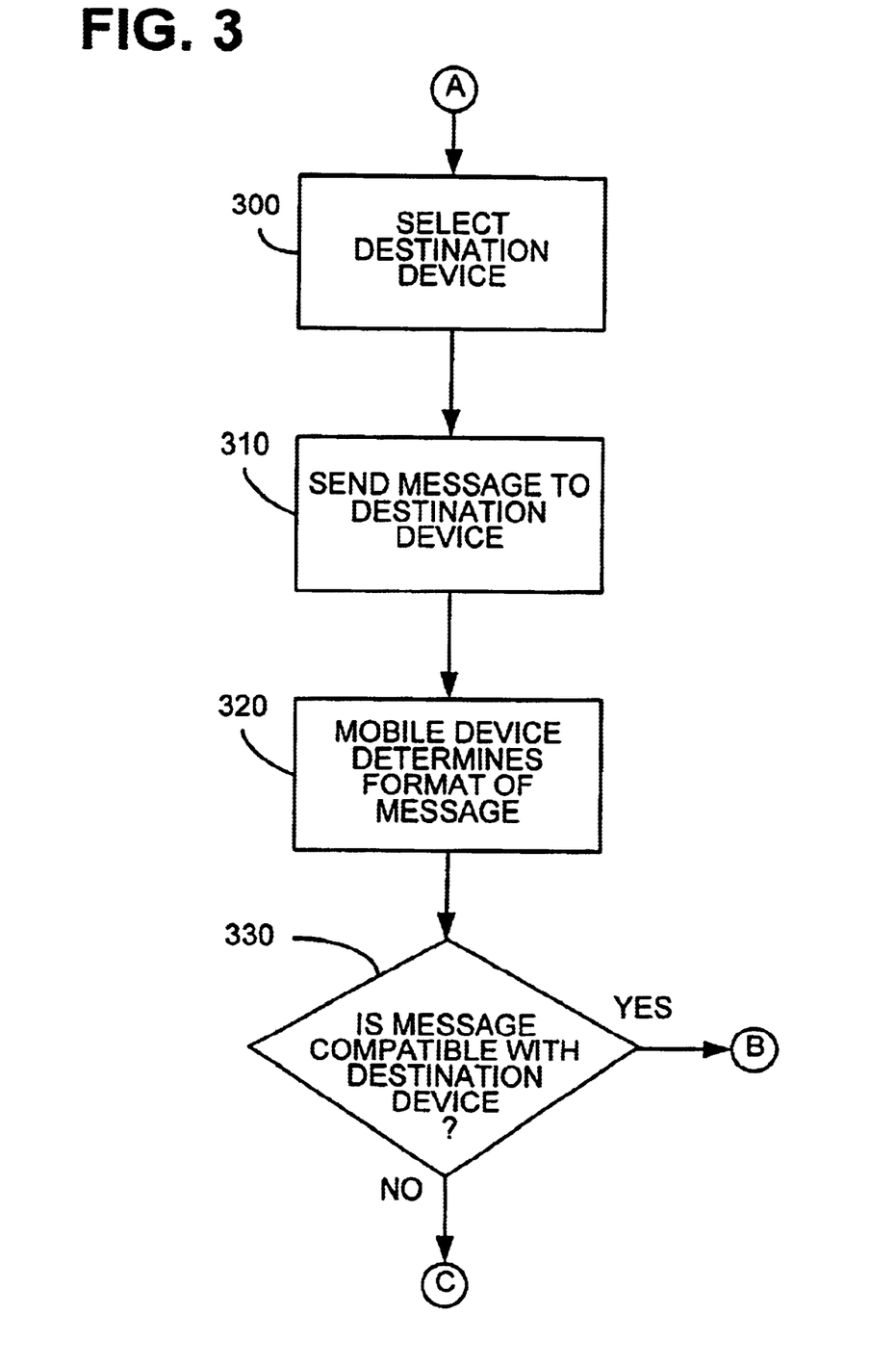
FIG. 3 is a continuation of the method flow of FIG. 2.

The method flow re-enters FIG. 3 along path A and continues to step 300 where the mobile device using a service discovery technology such as Jini™, UpnP™ or Salutation™ will try to find all destination devices within a specific range that meet the desired criteria that would be established by the user through some preferences. For example, the mobile device could be directed to find all devices capable of printing on an 8½" by 11" sheet of paper, or it could be directed to find all facsimile machines or all copiers enabled in that area. The device may be a facsimile machine, a photocopier, or a printer having a wireless communication capability such as, for example, Bluetooth. Bluetooth technology eliminates the need for wires, cables and connectors for and between cordless or mobile phones, modems, headsets, personal digital assistants, computers, printers, projectors, local area networks, and the like. The method flow proceeds to step 310 where the user sends the message to destination device 150. The method flow progresses to step 320 where mobile device 130 determines the format required by destination device 150. At step 330, the method flow queries as to whether or not the message is in a format that is compatible with the destination device. If the answer to the query at step 330 is "yes," then the method flow progresses along path B.

Figure 4:
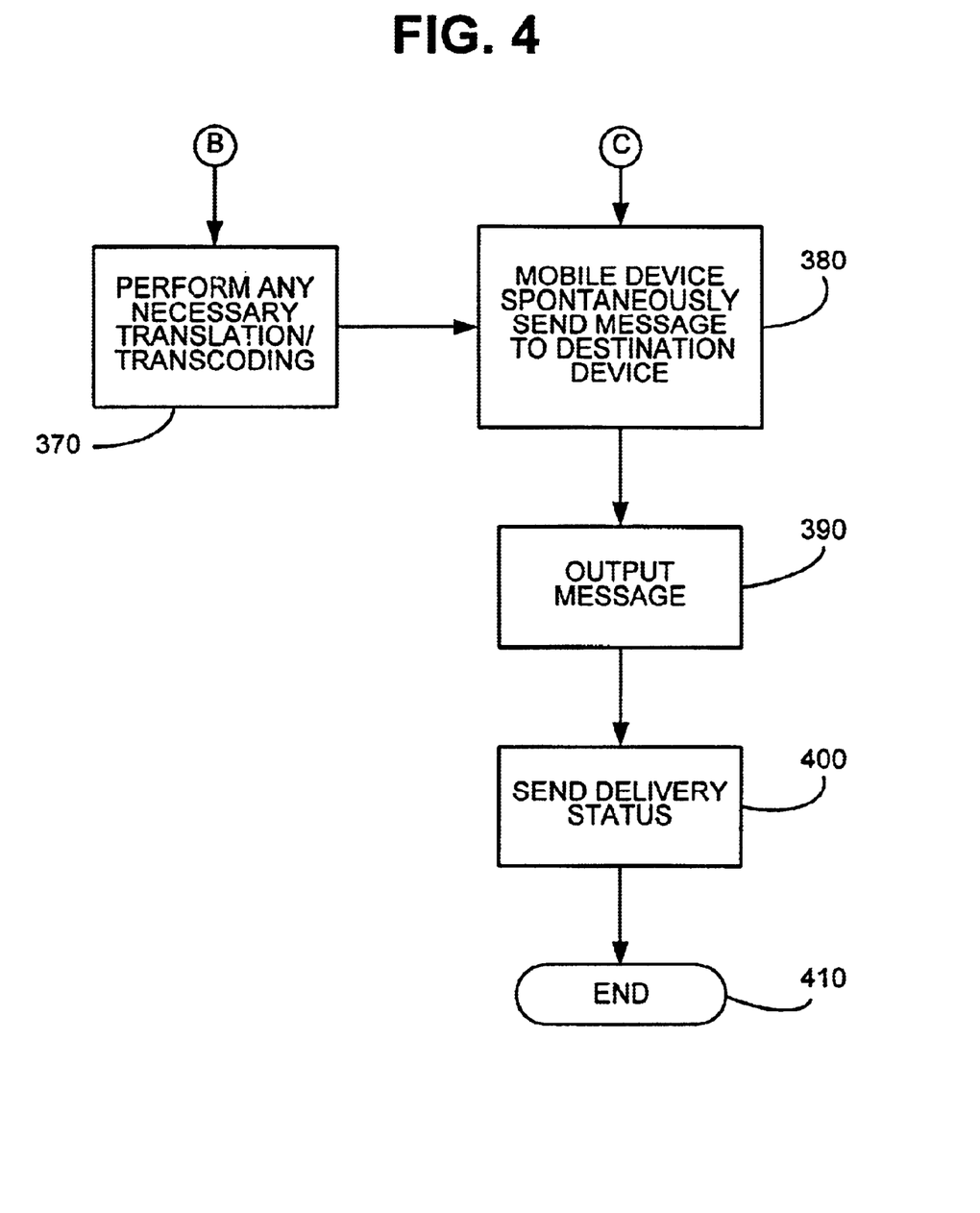
FIG. 4 is a continuation of the method flow of FIG. 3.

Now turning to FIG. 4, the method flow re-enters path B and continues at step 370, where the necessary translation or transcoding is conducted and then to step 380. If, however, at step 330 the answer to the query is "no," then the method continues along path C to step 380 of FIG. 4, where the mobile device 130 spontaneously communicates the message to the destination address via a wireless communication system such as Bluetooth. The method proceeds to step 390 where the destination device 150 outputs the message to the recipient; and at step 400, the status of delivery is communicated to the data center 120 or the mobile device 130. The method flow ends at step 410 where the mobile device 130 would release the connection to the destination device 150 optionally notify the data center 120 that the message has been delivered.

Figure 5:
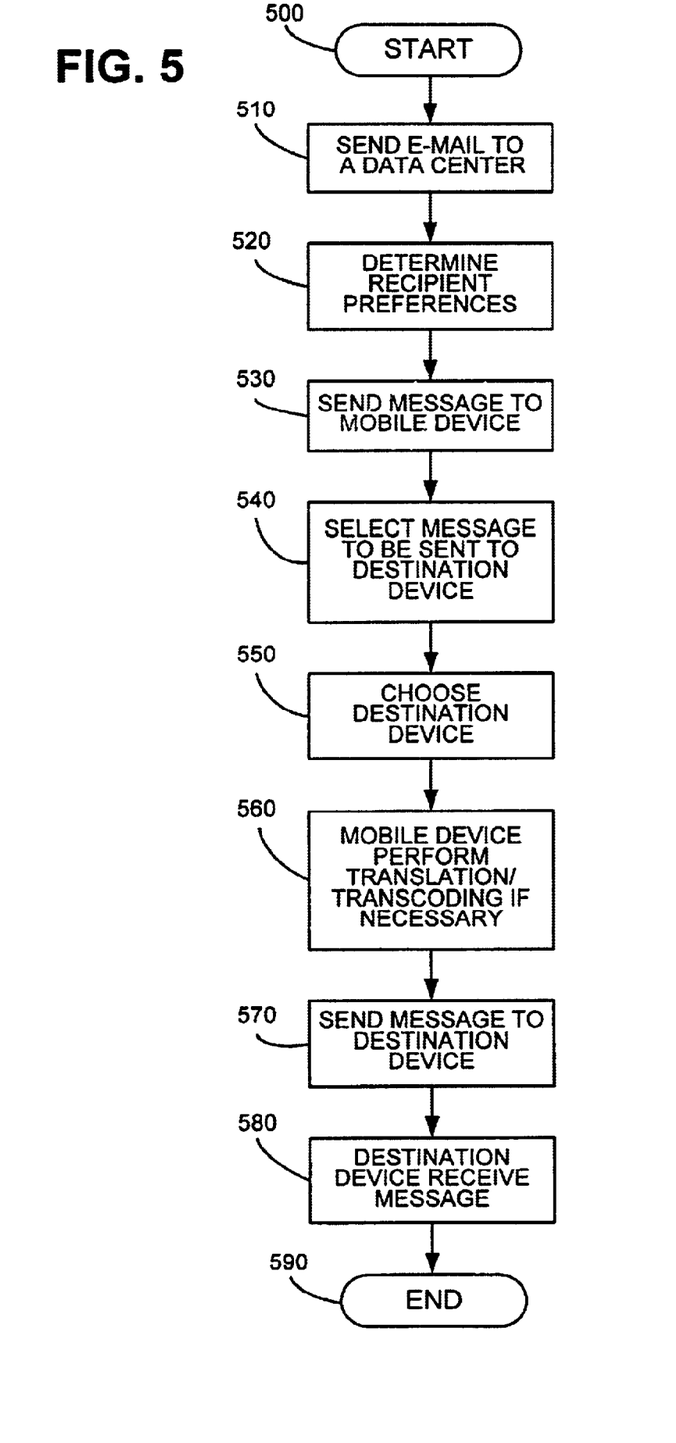
FIG. 5 is a flow chart depicting the method of a specific embodiment of the present invention.

Now turning to FIG. 5, there is shown another embodiment of a method flow of the present invention detailing one embodiment of the present invention wherein the sender transmits an email, and the recipient desires to retrieve a facsimile. The method flow begins at step 500 where the message sender logs onto his/her e-mail messaging system. The method flow continues at step 510 where the email is sent through a website or a server to data center 120. The user may be sending a message to the user's e-mail system which has then been directed to forward all received e-mail messages to data center 120. In either case, data center 120 receives the message.

At step 520, data center 120 determines the recipient and any preferences designated by the recipient. These preferences indicate the recipient's desired method for receiving the message. For example, if a recipient typically carries a cellular telephone, then the recipient may direct the data center 120 to always send the message to the recipient's cellular telephone. If, however, the recipient prefers to carry a personal digital device or a pager, the recipient may designate these devices as preferred mobile devices. The recipient may also indicate in the preferences certain priorities for messages, or recipient may specify call screening choices. In describing this embodiment of the present invention, the recipient has decided to receive the message through his/her personal digital assistant. The method progresses to step 530 where data center 120 sends the message to mobile device 130. The message may be sent in whole or in part based upon the size of the document and the capabilities of the mobile device 130. At step 540, the recipient selects certain e-mail messages and certain attachments to be sent to a destination device. Unread and undeleted messages may be stored at either data center 120 or mobile device 130 for later transfer to destination device 150. Continuing to step 550, the recipient chooses destination device 150 for receiving the message. In this embodiment, the destination device for receiving the message is a facsimile.

Progressing to step 560, the method continues where mobile device 130 performs document translation from e-mail format to facsimile format, i.e., a TIFF image, in order to successfully transmit the message to facsimile 150. Mobile device 130 also translates selected attachments which are formatted in various program applications as needed, such as a TIFF format. The method proceeds to step 570 where mobile device 130 routes the message using a wireless communication, such as Bluetooth, to the facsimile device 150. At step 580, facsimile 150 receives and prints the message. The method ends at step 590.

While the present invention has been disclosed and described with reference to a single embodiment thereof, it will be apparent, as noted above, that variations and modifications may be made therein. The above specification describes a new and improved system and method for remote receipt of a message, such as a telephone, email, facsimile or paper message. It is realized that the above description may indicate to those skilled in the art additional ways in which the principles of this invention may be used without departing from the spirit of the invention. Therefore, it is intended that this invention be limited only by the scope of the appended claims.

What is claimed is:

1. A method for retrieving a message remotely comprising the steps at (a) sending at least one message via facsimile, a computer-based device, a telephone or a photocopier to a data center (b) invoking by the data center a user of a destination device or a user of a mobile device stored preferences to determine in which format the user of the destination or mobile device will receive the message (c) sending at least one message from the data center to the destination device, wherein the sending of the message is based upon the data centers assessment of the user of the destination device stored preferences;

(d) sending said at least one message from the data center to the mobile device, wherein the sending of the message is based upon the data center's Assessment of the user of the mobile device stored preferences;

(e) translating said at least one stored messages to a format compatible with said destination device; and (f) communicating spontaneously said at least one message between said mobile device, wherein the mobile device is a telephone or computer-based device and said destination device, wherein the destination device is a photocopier, or a facsimile, so that the user of the destination device or the user of the mobile device will receive the message in the desired mobile device or destination device in a compatible format.

2. The method of claim 1 wherein said message is divided into sections and sent to said mobile device in said sections.

3. The method of claim 1 further including sending a confirmation notification to said mobile device that said message was sent to said destination device address.

4. The method of claim 3, further Including the step of determining said recipient preferences and sending said message according to said recipient preferences.

5. The method of claim 1 further including sending a confirmation notification to said data center that said message was sent to said mobile device.

6. The method of claim 1 further including printing said message at said destination device.

7. The method of claim 1, further including the step of determining a recipient.

8. The method of claim 1 wherein said mobile device is a personal digital assistant.

9. The method of claim 1 wherein said messages are delivered securely and stored until said recipient retrieves said messages.

10. The method of claim 1 wherein said mobile device is a cell phone.

11. The method of claim 1 wherein said mobile device is a laptop.

12. The method of claim 1, wherein said message is an e-mail.

* * * * *